J. Hawse.

Feed Box.

N°. 91,013. Patented Jan. 8, 1869.

Witnesses,
N. S. Worth,
Jno. A. Ellis,

Inventor;
J. Hawse
pr.
J. H. Alexander
Atty.

JOSEPH HAWSE, OF WOLCOTT, VERMONT.

Letters Patent No. 91,013, dated June 8, 1869.

IMPROVEMENT IN FEED-BOX.

The Schedule referred to in these Letters Patent and making part of the same.

*To all whom it may concern:*

Be it known that I, JOSEPH HAWSE, of Wolcott, in the county of Lamoille, and State of Vermont, have invented certain new and useful Improvements in Feed-Boxes; and I do hereby declare that the following is a full, clear, and exact description thereof, reference being had to the accompanying drawings, and to the letters of reference marked thereon, which form a part of this specification, and in which—

Figure 1:
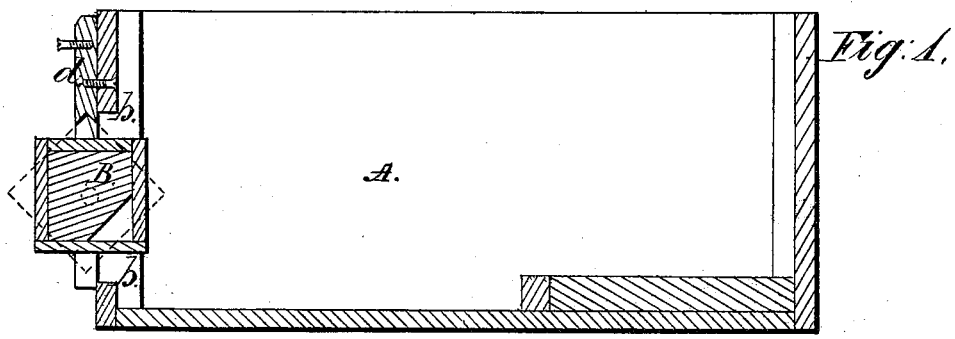

Figure 1 represents a longitudinal section of my feed-box; and

Figure 2:
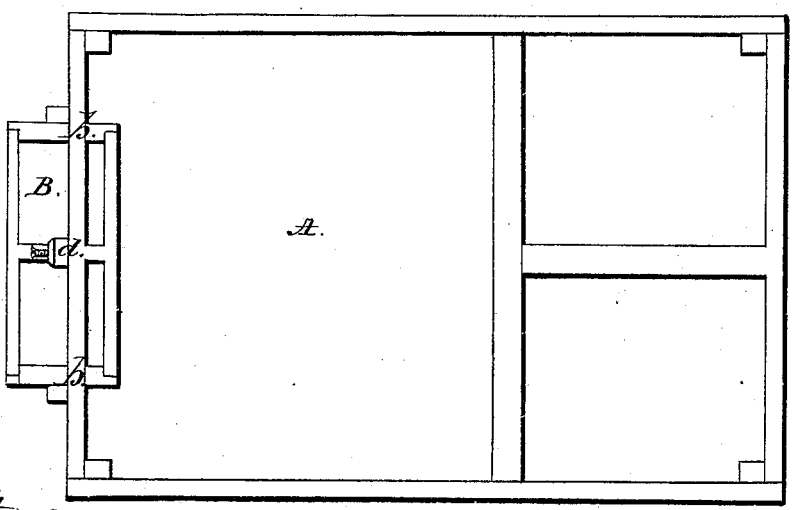

Figure 2, a plan view of the same.

Similar letters indicate like parts in both figures.

The nature of my invention consists in the employment of a pivoted feed box, constructed as hereinafter specified.

To enable others skilled in the art to which my invention appertains, to make and use the same, I will now describe its construction and operation.

In the accompanying drawings—

A represents an ordinary box, to contain the feed, the forward end being formed with an opening, $b$, into which is pivoted the feed-box B.

$d$ is a button, secured to the front end of the box A, so as to retain the feed-box in proper position, when ready for feeding.

It will be observed, that a feed-box constructed in this manner is always kept dry, as it can be easily turned over in wet weather, thereby preventing the rain from entering the inside of the feed-box.

Having thus described my invention—

What I claim as new, and desire to secure by Letters Patent, is—

The box A, provided with receptacles $t\ t$, and pivoted feed-box B, arranged to operate substantially in the manner and for the purpose described.

In testimony that I claim the foregoing as my own, I affix my signature, in presence of two witnesses.

JOSEPH HAWSE.

Witnesses:
ISRAEL Z. CURRIER,
L. P. PRESTON.